United States Patent [19]

Bonk et al.

[11] Patent Number: 4,921,680
[45] Date of Patent: May 1, 1990

[54] REFORMER SEAL PLATE ARRANGEMENT

[75] Inventors: Stanley P. Bonk, West Willington; George F. Morganthaler, Windsor, both of Conn.; Yoshiharu Miura, Yokohama, Japan

[73] Assignee: International Fuel Cells Corporation, South Windsor, Conn.

[21] Appl. No.: 406,399

[22] Filed: Sep. 12, 1989

[51] Int. Cl.[5] .............................................. B01J 8/06
[52] U.S. Cl. ....................... 422/197; 48/89; 48/94; 48/127.9; 122/510; 165/82; 165/162; 422/204; 422/240
[58] Field of Search ............. 48/89, 94, 196 A, 196 R; 422/197, 202, 204, 240, 310, 311; 122/510; 165/82, 162, 178

[56] References Cited

U.S. PATENT DOCUMENTS 4,661,323  4/1987  Olesen .................................. 422/197
4,820,314  4/1989  Cohen et al. ........................... 48/94
4,847,051  7/1989  Parenti ................................. 422/202

Primary Examiner—Joye L. Woodard
Attorney, Agent, or Firm—Edward L. Kochey, Jr.

[57] ABSTRACT

A stepped support and seal plate (44) is sealed to firing tube (18) with an axially compressed seal (62). It carries sleeves (24) and is sealed thereto by gasket seals (55). A diagonal movement seal (69) seals plate (44) to the wall of pressure vessel (10). Bellows (76) has a straight portion (77) at the hot end. Insulation (14) is tapered to provide variations in heat transfer from the bellows to provide a uniform strain pattern in the bellows.

8 Claims, 2 Drawing Sheets

REFORMER SEAL PLATE ARRANGEMENT

TECHNICAL FIELD

This invention relates to high temperature gas reformers and in particular to a seal plate avoiding flue gas bypass around the reformer tubes.

BACKGROUND OF THE INVENTION

Hydrocarbon fuel reformers which are used in fuel cell power plants take raw hydrocarbon fuel such as natural gas, propane or naphtha and catalytically convert the raw fuel to a hydrogen rich fuel gas suitable for use as an anode fuel. Raw fuel is percolated through catalyst beds which are contained in tubes mounted within the reformer housing. Catalytic conversion is carried out at elevated temperatures in the range of 430 C. to 930 C. The reformer includes a pressure vessel as the reformer housing within which a burner is operated to establish these elevated temperatures. Reformer tubes are in the form of bayonet tubes with an upward flow in the outer portion through the catalyst bed and a downward flow through the inner portion providing some counterflow heat recovery from the reformed gas to the incoming gas. The flue gas passes a heat exchange relationship with the outer surface of the bayonet tubes. It is maintained in close contact therewith by surrounding sleeves.

At the lower end of the bayonet tubes there is provided a support and seal plate which supports the sleeves, and seals against a central burner assembly, the pressure vessel, and the sleeves while permitting the gas flowing inside the sleeves to pass through the seal plate to a plenum therebelow.

Because of the high temperatures existing, the seal plate must be of austenitic materials while the pressure vessel is of ferritic material. The pressure vessel is internally insulated and at operating conditions has a temperature level of about 150 C. The internal support and seal plate is exposed to the high temperature gases and accordingly is of austenitic material and operates at about 600 C. Considerable differential expansion exists because of the differential temperature between the seal plate and the pressure vessel, and this differential expansion is exacerbated by the fact that stainless steel has a significantly higher coefficient of expansion than the ferritic material.

Different sealing problems occur at three points with cost and reliability being a factor in each situation.

It is desired that all of the gas flow through the annular space between the sleeve and the bayonet tubes. Accordingly, the seal plate must be sealed to the central burner structure, each of the sleeves, and the pressure vessel.

SUMMARY OF THE INVENTION

A rigid reformer outlet header assembly is centralized and pivotally supported from the pressure vessel, thus establishing the position from which differential vertical expansion must take place. The header structure in turn supports the bayonet tubes which carry lugs supporting the support and seal plate near the lower end of the bayonet tubes. Sleeves surrounding the bayonet tubes and having an annular gas space therebetween are bolted and gasketed to the seal plate surrounding openings therethrough since the sleeves may move with the seal plate and substantially no differential expansion occurs between the sleeve and the seal plate.

The centrally located burner tube has a refractory lining with a tubular seal structure therearound and it is against this steel structure which the seal plate is sealed. Since this plate operates at a significantly high temperature and the diameter is relatively small, there is relatively little radial differential expansion between the two members, most of this occurring during transients. Accordingly, a compressed seal with a sealing medium which can be exuded outwardly against the member being sealed is used with this capable of following the slight radial difference and capable of sliding for vertical differences.

The outer edge of the seal plate is sealed to the pressure vessel preferably with a specially arranged bellow seal. This bellows is of austenitic material, the same as the seal plate and is secured at its lower end to the seal plate where its temperature and diametral expansion is substantially the same as the seal plate. The bellows has a straight portion at the lower end where the initial temperature gradient may be absorbed in an area free from the corrugations. It thereafter passes through the corrugations through the other end of the plate which is secured to another annular member also so austenitic material. This member, however, is welded to a horizontal annular plate which in turn is welded to the pressure vessel. The temperature at the upper end of the bellows therefore tends to approximate that of the walls of the vessel thereby avoiding strain between the joined bellows and the first annular plate. The juncture between the austenitic plate and the ferritic plate occurs at a relatively lower temperature and the only differential strain which must be absorbed is that due to the differential coefficient of expansion.

The vertical component of the differential movement is taken by the bellows in the conventional manner while the diametrical movement is absorbed through the appropriate adaptation of temperature gradients.

DESCRIPTION OF THE PREFERRED EMBODIMENT

Figure 1:
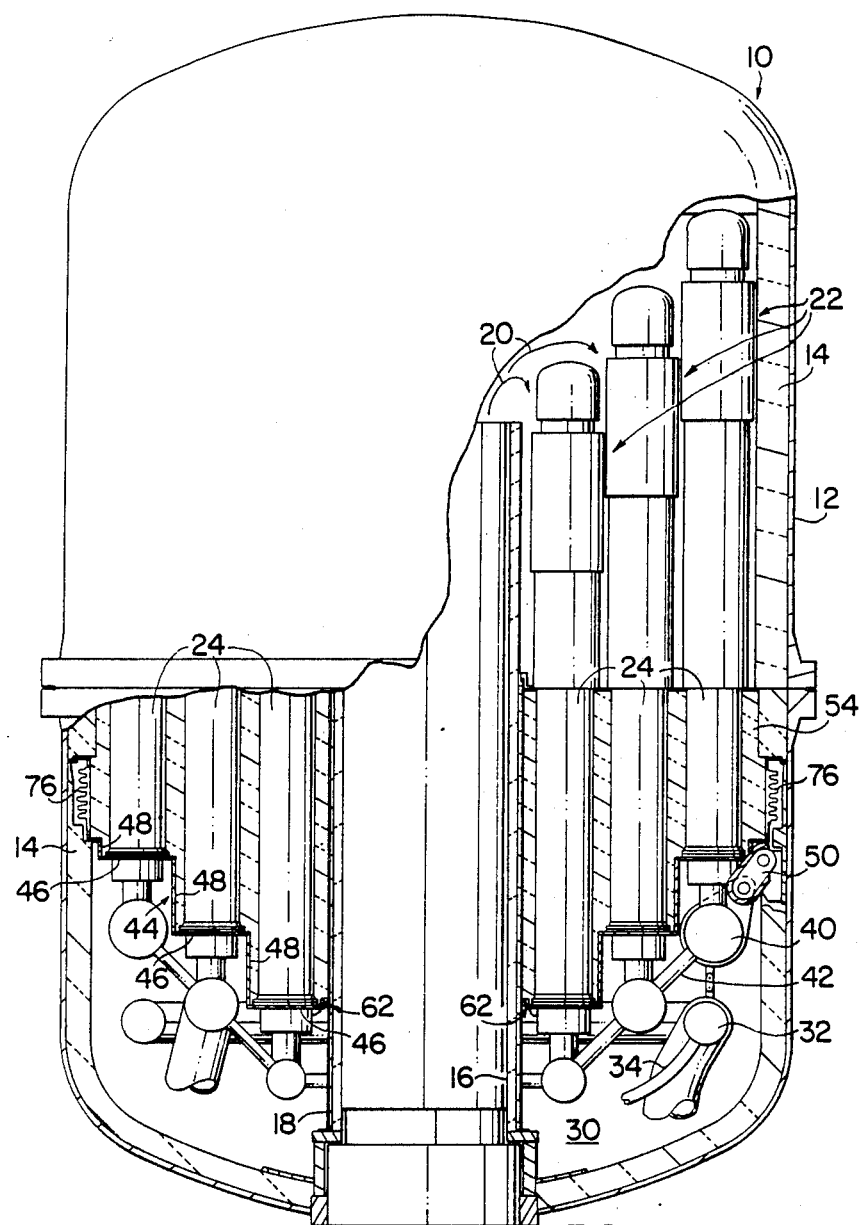
FIG. 1 is a sectional elevation of the gas reformer.

Reformer pressure vessel 10 has a wall 12 and internal insulation 14. A burner or firing tube structure is centrally located and supported from the pressure vessel, including a refractory lining 16 and the surrounding tubular seal structure 18. A burner (not shown) is located therein and fired, with flue gas 20 passing out from the tube and downwardly over bayonet reformer tubes 22. The lower portion of each bayonet tube has a gas confining sleeve 24 (FIG. 2) with the flue gas 26 passing between the sleeve and the bayonet tube and out through opening 28 into outlet plenum 30.

The gas to be reformed passes from inlet header 32 through a plurality of flexible tubes 34 into the lower annular space 36 of each bayonet tube. This annular space is packed with catalyst with the gas passing upwardly from the catalyst bed and returning down through the central section 38 of each bayonet tube to one of the outlet headers 40. These various circular outlet headers are joined with connecting tubes 42 to form a rigid outlet header system.

It is necessary for all the flue gas to pass through the annular space inside sleeve 24 to plenum 30 and accordingly for any alternate route to be blocked and sealed.

An annular support and seal plate 44 is located in the space between the burner tube assembly at burner tube 18 and the wall 12 of the pressure vessel. This support and seal plate is formed of three annular horizontally extending plates 46 and three vertically extending segments 48. Seals are required between this support and seal plate 44 and the burner tube, the bayonet tube sleeves, and the pressure vessel.

Within the pressure vessel 10, which is of ferritic material, there are three links 50 supporting a rigid header outlet system 40, the header outlet structure being of austenitic material. The austenitic material is required since the gas at that point will be about 600 C.

The bayonet tubes 22 are posted from the outlet headers and include support lugs 52 on each bayonet tube. These lugs in turn support the support and seal plate 44. This support and seal plate must also be of austenitic material because of the temperature level at which it must operate.

Figure 2:
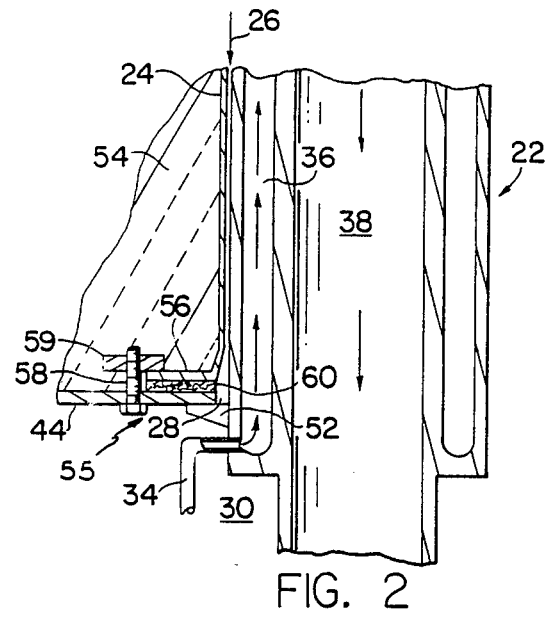
FIG. 2 is a detail of the sleeve connection to the seal plate.

Surrounding the lower portion of the sleeves which surround the bayonet tubes there is loose fill insulation 54. The insulation prevents recirculating or eddying gas flow in this area and also provides a block for heat flow particularly toward the surrounding pressure vessel, this being in addition to the internal insulation located on the pressure vessel. FIG. 2 illustrates the gasket gas seal 55 between the sleeves 24 around the bayonet tubes and the support and seal plate 44. Each sleeve has an outwardly extending flange 56 and is secured with bolt 58 and wing nut 59, while a seal gasket 60 is entrapped therebetween. The sleeve 24 is of nickel chromium-iron alloy as is the plate 44. Both this sleeve and this plate are operating at approximately the same high temperature level. Expansion of the support and seal plate carries the sleeve with it so that any differential movement between the two at the sealed location is extremely small. Accordingly, an entrapped gasket 60 of ceramic fiber is economical and will operate satisfactorily for long periods of time.

The support and seal plate 44 is adjacent to the firing tube structure 18 where provision must also be made for sealing. Vertical movement of the support and seal plate 44 is dictated, with respect to the pressure vessel, by the expansion at temperature downwardly of the high temperature austenitic material of the outlet header system, and upwardly by the expansion of the portion of the bayonet tubes below the lugs. The firing tube structure is supported from the pressure vessel at the lower end and expands upwardly therefrom in accordance with its temperature, this tube also being of austenitic material. A portion in the plenum is substantially at the exit gas temperature and possibly a little higher because of heat transferred through the refractory inside the burner tube. Its temperature in general approximates that of the support and seal plate. There will be some vertical movement between the two since the support and seal plate will tend to move down while the firing tube structure will tend to move up.

Figure 3:
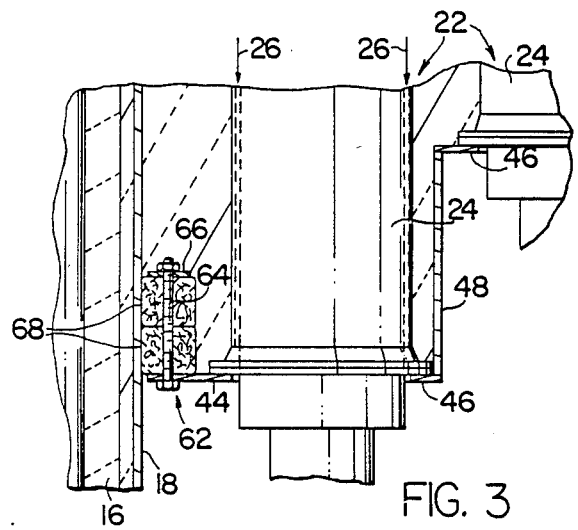
FIG. 3 is a detail of the compressed seal between the seal plate and the burner assembly.

The diametral expansion of the two will be approximately equal although it is anticipated at times that the firing tube will expand slightly more than the seal plate. Accordingly, an axially compressed and radially deformable inner seal 62 (FIG. 3) is deemed optimum for this sealing condition. Bolt 64 with washer 66 compresses gasket material 68 of braided ceramic fibre which is readily deformable between the washer and the support and seal plate 44. This compression deforms the material so that a portion is deformed outwardly against the plate 18 forming a pressure contact seal. This seal may readily slide vertically as required and the elasticity of the seal permits it to maintain contact for the limited horizontal differentials in expansion.

Figure 4:
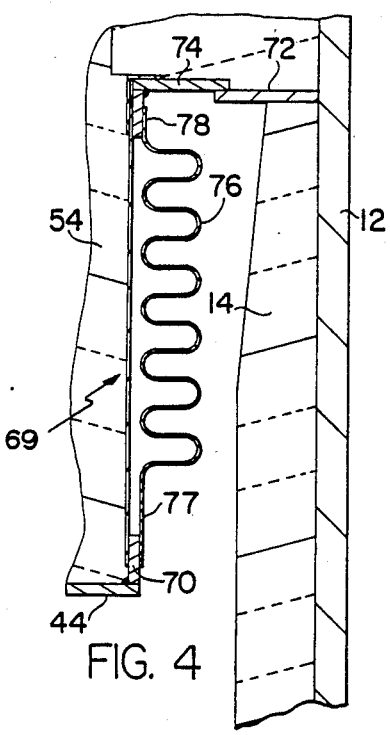
FIG. 4 is a detail of the seal between the seal plate and the vessel wall.

Referring now to FIG. 4 the bellows form of the diagonal movement outer seal (69) between the wall 12 of the pressure vessel and the support and seal plate 44 is shown. A short vertical ring 70 is welded to the support plate 44, this ring also being of austenitic material.

An inwardly extending annular rigid seal plate, or welding bar ring 72 is welded at a higher elevation to the wall of the pressure vessel. This ring is of ferritic material. An L-shaped member 74 of austenitic material is welded to ring 72 with this L-shaped ring previously being welded to bellows 76. The rigid seal plate therefore effectively has a first inwardly extending ferritic portion with an austentic portion extending inwardly therefrom.

This corrugated bellows 76 has a plurality of corrugations oriented to accept vertical compression and expansion and has at its lower end a straight cylindrical portion 77. The length of this section is established by evaluation of the temperature pattern through the length of the section and the strains caused thereby. Steep thermal gradients should be contained within the straight section to avoid high thermal stresses in the convulutions of the bellows. The thermal gradient pattern may be modified by appropriate tailoring of the insulation thickness. The lower portion is welded to ring 70.

During operation the end of the support and seal plate with respect to the pressure vessel wall will move diagonally, with a horizontal component of 1.8 cm and a vertical component of 1.1 cm, this substantially being downwardly 30 degrees from the horizontal. Accordingly, seal structure at this location must be a diagonal movement outer seal. It is emphasized that this outer movement is not an offset of the centerlines, but is a diagonal movement in opposite directions at diametrically opposed portions of the structure.

A bellows is well known for accepting longitudinal movement which is the vertical differential in this case. The radial or diametrical movement is accepted by the appropriate selection of materials and location of insulation. The support and seal plate 44 operating on the order of 600° C. will expand outwardly and the lower portion of the bellows, being of the same material and securely welding thereto will operate at the same temperature. Accordingly, the lower portion of the bellows will also expand in like amount. The upper portion 78 of the bellows is secured to L-shaped member 74 which in turn is welded to ring 72. The upper portion of the bellows therefore tends to approach the temperature of the vessel wall. Since it is of austenitic material it therefore will tend to expand more than the vessel wall for a given temperature difference from the installed ambient temperature. This operates, however, on the order of 150° C. and it is well known that austenitic and ferritic material may be joined and will tolerate the strain enforced by such differential expansion.

Throughout the length of the bellows the temperature will change from the high temperature at the lower end to the low temperature at the upper end. Since a significant portion of the gradient may occur at the lower end, the straight section 77 is supplied so that the thermal strains are not located at the same location as the complex stress pattern within the convolutions of the bellows. Pressure vessel wall internal insulation 14 has a thickness of 7.5 cm at the lower end of the bellows and is tapered to a thickness of only 2.5 cm at the upper end. This therefore provides variations in heat transfer which facilitate a relatively uniform temperature gradient throughout the bellows.

The stepped nature of the support and seal plate 44 has particular significance in combination with these other seals. While there is always an attempt to maintain uniform temperatures throughout the various gas flow paths, it can readily be expected that portions of the seal plate, for instance around the outer ring of bayonet tubes, will tend to be hotter than those around the inner ring. With a single annular plate such differential temperature will lead to differential expansion, and buckling of the plate which could in turn place additional loading and movement on the seals. Therefore, the seal plate 44 is broken into three annular ring segments 46 with these joined by the vertical segments 48. Each ring segment may therefore expand in accordance with its own temperature level while the vertical segments will deflect to tolerate the differential expansion, this will permit the seal plate to remain flat and facilitate the seals as described before.

Figure 5:
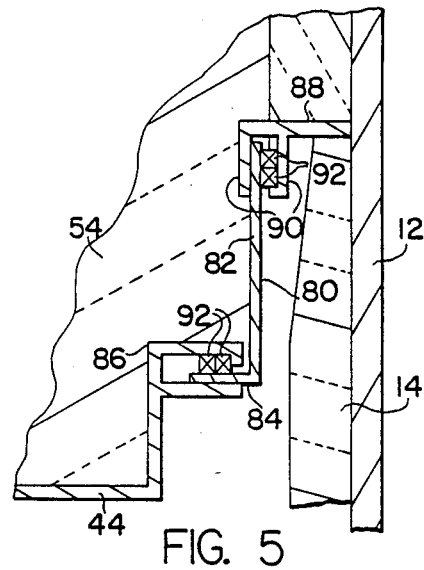
FIG. 5 is an alternate seal between the seal plate and the vessel wall.

FIG. 5 illustrates an alternate diagonal movement seal wherein an L-shaped plate 80 formed of a vertical cylindrical ring 82 and an annular cylindrical ring 84 is formed of austenitic material. Seal plate 44 has an outwardly extending seal entrapment portion 86 containing seals 92 of ceramic fibre. Similarly, the ferritic ring 88 which is secured to the pressure vessel has downwardly extending portions 90 of austenitic material which are arranged to entrap seals 92. Assembly of the seal structure 80 within these sealing areas is accomplished by welding outside the pressure vessel. The seal plate 44, with the seal structure is placed in the pressure vessel, and ferritic ring 88 is then welded to the vessel.

We claim:

1. A fired gas reformer seal plate arrangement comprising:
   an internally insulated pressure vessel having a wall;
   a rigid reformer gas outlet header system centered within said pressure vessel and supported and spaced from said pressure vessel walls;
   a vertical central firing tube structure within said pressure vessel supported from said pressure vessel;
   an annular support and seal plate in the space between said firing tube structure and said pressure vessel wall, located above said header system;
   a plurality of vertical bayonet reformer gas tubes supported from said outlet header system and extending through openings in said support and seal plate, with an annular flow path around each bayonet tube of said plurality of bayonet tubes at each opening of said openings;
   a plurality of support lugs on each bayonet tube of said plurality of bayonet tubes for supporting said support and seal plate in spaced relationship from each bayonet tube of said plurality of bayonet tubes;
   a plurality of gas confining sleeves supported on said support and seal plate, surrounding each bayonet tube of said plurality of bayonet tubes, and with an annular space between each sleeve of said sleeves and each bayonet tube of said plurality of bayonet tubes in fluid communication with a plenum below said support and seal plate via the annular flow paths between each bayonet tube of said plurality of bayonet tubes and the support and seal plate;
   a bolted gasket seal between each sleeve of said sleeves and said support and seal plate;
   an axially compressed and radially deformable inner seal between said support and seal plate and said firing tube structure; and
   a diagonal movement outer seal between said support and seal plate and said pressure vessel wall.

2. A fired gas reformer seal plate arrangement as in claim 1;
   said reformer outlet header system pivotally supported from at least three points on said pressure vessel wall.

3. A fired gas reformer seal plate or arrangement as in claim 1:
   said support and seal plate formed of a plurality of annular seal plate segments located at different elevations, and including vertical cylindrical portions connecting adjacent seal plate segments, whereby differential expansion between the various seal plate segments may by absorbed through the vertical portions.

4. An apparatus as in claim 3 wherein said diagonal movement outer seal comprises:
   an inwardly extending annular rigid seal plate rigidly and sealingly secured to said wall;
   a corrugated bellows welded to said rigid seal plate, having a plurality of circumferential corrugations and extending downwardly therefrom;
   a lower straight cylindrical portion on said bellows; and
   the lower end of said bellows weldingly secured to said support and seal plate.

5. An apparatus as in claim 3 wherein said diagonal movement outer seal comprises:
   an inwardly extending annular rigid seal plate rigidly and sealingly secured to said wall;
   a corrugated bellows welded to said rigid seal plate, having a plurality of circumferential corrugations and extending downwardly therefrom;
   a lower straight cylindrical portion on said bellows having a lower end weldingly secured to said support and seal plate;
   said inwardly extending rigid seal plate comprised of a ferritic material portion secured to said wall, and an austenitic portion extending inwardly therefrom;
   said wall being of ferritic material; and
   said support and seal plate and said bellows being of an austenitic material.

6. An apparatus as in claim 3 wherein said diagonal movement outer seal comprises:
   an intermediate seal member comprised of a vertical cylindrical portion having a lower end and an inwardly extending horizontal annular portion secured to the end thereof, whereby an L-shaped cross section is formed with the vertical and horizontal members stiffening each other;

a horizontally extending sliding seal between said support and seal plate and said intermediate seal member plate; and a vertically extending sliding seal structure between said wall and said intermediate seal member.

7. An apparatus as in claim 3 wherein said diagonal movement outer seal comprises:

an inwardly extending annular rigid seal plate rigidly and sealingly secured to said wall;

a corrugated bellows welded to said rigid seal plate, having a plurality of circumferential corrugations and extending downwardly therefrom;

a lower straight portion of said bellows having a lower end weldingly secured to said support and seal plate;

insulation located internally of said wall at the elevation of said bellows;

said insulation having a maximum thickness at the lower end of said bellows and a decreasing thickness toward the upper end of said bellows.

8. An apparatus as in claim 7:

said inwardly extending rigid seal plate comprised of a ferritic material portion secured to said wall, and an austenitic portion extending inwardly therefrom;

said wall being of ferritic material;

said support and seal plate and said bellows being of an austenitic material.

* * * * *